United States Patent Office 3,481,836
Patented Dec. 2, 1969

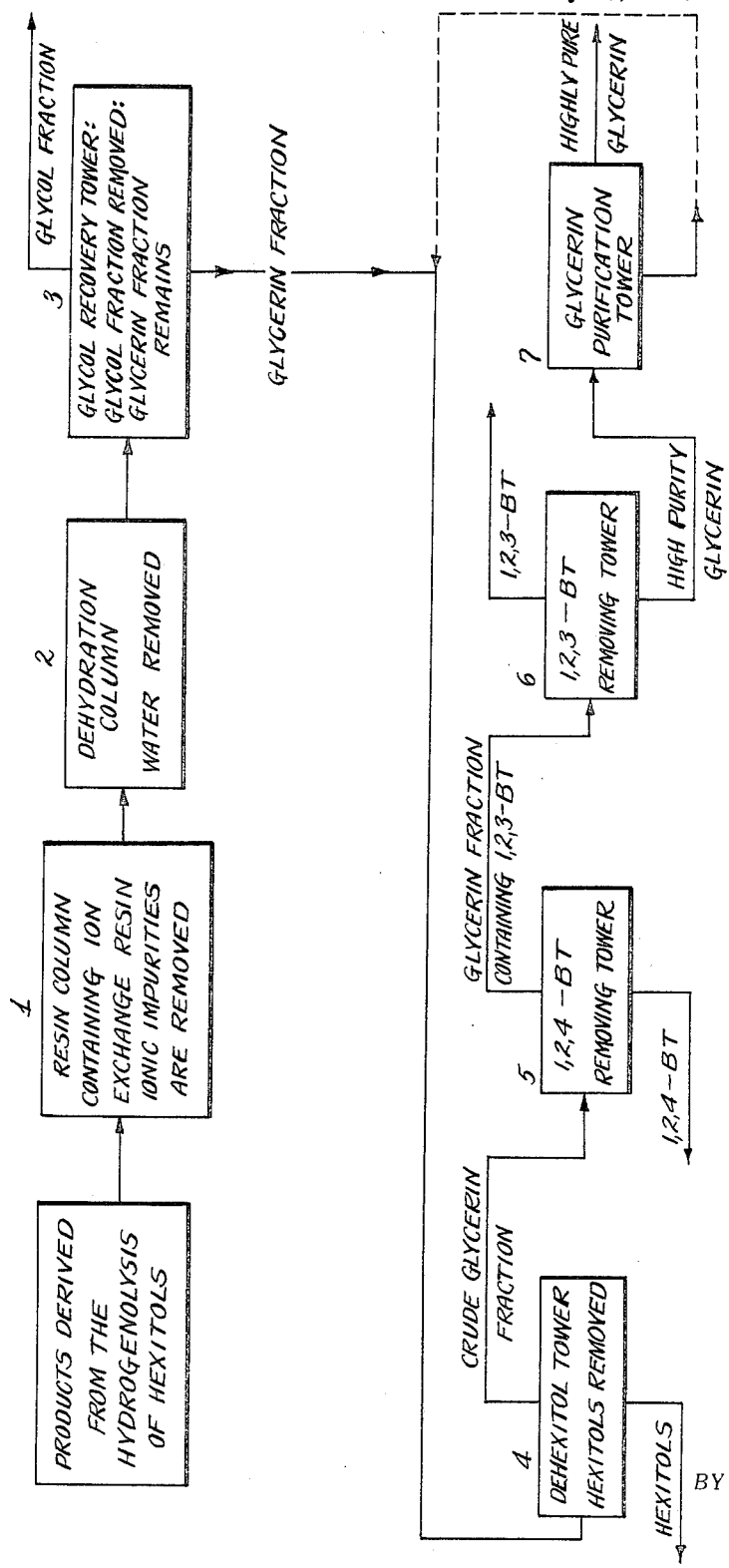

3,481,836
PROCESS FOR THE SEPARATION OF THE PRODUCTS DERIVED FROM THE HYDROGENOLYSIS OF HEXITOLS BY PLURAL STAGE VACUUM, STEAM DISTILLATION AT TEMPERATURES NOT EXCEEDING 200° C.
Tatsuo Nomura, Kunio Shimomura, and Masayuki Miyaji, Ube-shi, Yamaguchi-ken, Japan, assignors to Kyowa Chemicals Kabushiki Kaisha, Tokyo-to, Japan, a corporation of Japan
Filed May 29, 1967, Ser. No. 641,782
Claims priority, application Japan, May 28, 1966, 41/33,866
Int. Cl. B01d 3/38, 15/00; C07c 29/26
U.S. Cl. 203—38                                      6 Claims

ABSTRACT OF THE DISCLOSURE

The present invention is concerned with a process for the separation of the products derived from the hydrogenolysis of hexitols. More particularly, the present invention is concerned with a process for the treatment of the hydrogenolysis products of hexitols, such as sorbitol and mannitol, by steam distillation under reduced pressure to thereby obtain 1,2,3-butanetriol and 1,2,4-butanetriol as well as highly purified glycerin.

BACKGROUND OF THE INVENTION AND DESCRIPTION OF THE PRIOR ART

It is known to obtain glycerin, ethylene glycol (hereinafter referred to as EG), propylene glycol (hereinafter referred to as PG) and various other polyhydric alcohols from hexitols by hydrogenolysis of the hexitols under pressure in the presence of a suitable catalyst (for example, I.T. Clark, Ind. Eng. Chem. 50, 1125 (1953)). However, the recovery of highly purified glycerin from the reaction mixture is very difficult due to the fact that fractions having high boiling points, such as pentitols and erythritols, as well as fractions, the boiling points of which are very close to that of glycerin, such as 1,2,3-butanetriol (hereinafter referred to as 1,2,3-BT) and 1,2,4-butanetriol (hereinafter referred to as 1,2,4-BT) are contained therein as impurities.

Attempts on a commercial scale have been made to recover glycerin from the hydrogenated products by steam distillation under reduced pressure; however, for various reasons which will be discussed later this process has found only limited success (V.N. Balakhonstova & N.I. Gelperin, Khim. Prom. No. 2, 86–88 (1962)). In addition to the above noted prior art process, British Patent No. 992,165 and Japanese patent publication No. 25,331/65 also disclose processes for the isolation of highly purified glycerin from 1,2,3-BT and 1,2,4-BT.

However, the process described by Balakhonstova & N.I. Gelperin, Khim. Prom. (No. 2, 86–88, 1962) does not obtain the complete isolation of 1,2,3-BT and 1,2,4-BT, but merely indicates how a rough separation of the glycerin fraction from the unreacted fraction can be obtained. Because the boiling points of both 1,2,3-BT and 1,2,4-BT are very close to that of glycerin, the glycerin thus obtained contains the unseparated 1,2,3-BT and 1,2,4-BT etc. as impurities. Therefore, it is readily apparent that it is impossible to obtain by this process highly purified glycerin which is useful for industrial purposes. The processes disclosed by British Patent No. 992,165 and Japanese patent publication No. 25,331/65 have commonly serious disadvantages with respect to the heat instability of glycerin. The processes described in those patents use a series of distillation towers wherein 1,2,4-BT, which has a boiling point of 169.5° C. at 10 mm. Hg which is slightly higher than that of glycerin (166° C. at 10 mm. Hg), is put off from the bottom of the tower together with various other unreacted fractions, while glycerin and 1,2,3-BT (B.P. 159.5° C. at 10 mm. Hg) are distilled from the top of the tower. As a result, the separation of glycerin from 1,2,4-BT, which has a boiling point close to that of glycerin, may be made difficult by the coexistence of large amounts of various non-volatile fractions such as tetritols, and can give rise to various disadvantages as described as follows:

(1) An undue amount of glycerin may be left in undistilled state and therefore is put off together with various non-volatile fractions which of course results in a poor yield on the glycerin recovery. In other words, the glycerin returned to the system is decomposed to give PG, while other non-volatile fractions returned to the system are further subjected to the hydrogenolysis.

(2) There is admitted in these patents a more serious disadvantage in that the heat decomposition, dehydration, etheration and various other troubles of the unreacted hexitols and other polyols may be unavoidable. The foregoing problems arise because the distillation must be carried out at an elevated temperature, which is also liable to over-heating, in an effort to achieve sufficient separation of 1,2,4-BT from glycerin which are mixed with various non-volatile fraction containing $C_5$ and $C_6$.

SUMMARY OF THE INVENTION

The present invention provides a process for the separation of the products derived from the hydrogenolysis of hexitols and which process is capable of preventing the problems and defects associated with the prior art processes and which at the same time permits the recovery, with advantages of 1,2,4-BT and 1,2,3-BT as well as highly purified glycerin. These objects as well as other obvious objects will become apparent from the more specific description of the invention which follows.

DESCRIPTION OF THE DRAWING

The drawing of the application represents a flow diagram which generally sets forth the important steps of the process of the present invention.

DESCRIPTION OF THE PREFERRED EMBODIMENTS

A cursory consideration of this drawing will clearly indicate that the process generally entails the use of seven towers wherein certain fractions are removed so as to ultimately lead to the advantages as described above. According to the invention as described in relation to the drawing, the product derived from the hydrogenolysis of hexitols is first passed through an ion-exchange tower 1, a dehydration tower 2 and glycol-removing tower 3 successively to remove ionic impurities, water, lower alcohols and glycols and to thereby obtain a fraction, which contains primarily glycerin and the unreacted hexitols together with very small amounts of 1,2,3-BT and 1,2,4-BT and small amounts of pentitols and erythritols.

The obtained fraction is then passed through a dehexitol tower 4 where tetritols and their higher homologs are removed to thereby obtain the second fraction, which contains mainly glycerin, 1,2,3-BT and 1,2,4-BT. The second fraction thus obtained is passed through a 1,2,4-BT-removing tower 5 to recover 1,2,4-BT which leaves behind a third fraction. The third fraction is fed into a 1,2,3-BT-removing tower 6 where glycerin remains after the removal of 1,2,3-BT.

Alternatively, it is possible to first remove the 1,2,3-BT and then 1,2,4-BT.

According to the present invention, highly purified glycerin can be recovered with a good yield by distillation at 200° C., at 45 mm. Hg. The amount of glycerin, which remains in the system together with the fractions which possess high boiling points, is only about 3%, since the tetritols and their higher homologs are separated sufficiently in the dehexitol tower 4.

According to a further feature of the present invention, the steam distillation in the dehexitol tower 4, the 1,2,4-BT-removing tower 5 and the 1,2,3-BT-removing tower 6 is carried out at a temperature of not more than 200° C. under reduced pressure. Moreover, it is possible to recover, without injuring their qualities, tetritols and their higher boiling point homologs which are useful for further dehydrogenation. In addition, glycerin, 1,2,3-BT and 1,2,4-BT can be advantageously recovered with good yields.

It is well known that polyols such as glycerin may be converted into polyglycerin and the like when heated at a temperature above about 200° C. in the presence of a suitable acidic or basic catalyst. Likewise the hexitols specifically are also prone to dehydration and intramolecular etheration when heated in excess of 200° C. and in the presence of a catalyst and there are produced in this manner hexitans such as sorbitan and mannitan, as well as hexides, such as sorbide and mannide. It is assumed that the dehydration may be more or less carried out even under the neutral conditions defined by the present invention.

The operation conditions of the dehexitol tower 4 have been investigated and it has been determined that the upper limit of the distillation temperature should be about 200° C. According to the observations, a distillation temperature higher than about 200° C. can give rise to serious disadvantages such as the rapid dehydration and the rapid etheration of hexitols. However, the decomposition of hexitols in an amount of only 2% may be observed when the reaction is carried out for 8 hours at a temperature lower than about 200° C., for example 190° C.

It was also discovered that only a very small amount of glycerin can be obtained even when such cycloethers as hexitans and hexides, which were obtained by the decomposition of hexitols, are further recycled to the hydrogenolysis system as raw materials.

Evidence for these novel findings can be exemplified by the following table. In this table, the reaction product, which is obtained from the remaining fraction in the dehexitol tower 4 by the distillation of 200° C., is compared with another product, which is obtained in a similar manner to that described above except that a distillation temperature of 230° C. was used. Basically the table indicates the significant use of 200° C. rather than 230° C. as the distillation temperature.

TABLE.—COMPONENT ANALYSIS OF HYDROGENATED PRODUCTS

A = Recovery of hexitols.
B = Results of the hydrogenolysis of recycled hexitol fraction.
a = Degradation ratio of hexitols (analysis by gas chromatography).
b = Reaction products (dry basis).
c = Conditions of the steam-distillation in the dehexitol tower (5).
d = Reaction conditions.
b1 = Glycerin, percent.
b2 = EG, percent.
b3 = PG, percent.
c1 = Temperature, C.°.
c2 = Pressure (reduced) (abs. mm. Hg).
c3 = Retention time, hour.
d1 = Reaction temperature, C.°.
d2 = Reaction time, min.
** = Pure sorbitol.

| Sample | A | | | | B | | | | |
|---|---|---|---|---|---|---|---|---|---|
| | c | | | | d | | b | | |
| | c1 | c2 | c3 | a | d1 | d2 | b1 | b2 | b3 |
| 1 | 200 | 45 | 5 | 3.5 | 210 | 100 | 22.0 | 11.2 | 9.6 |
| 2 | 230 | 45 | 5 | 48.5 | 210 | 100 | 10.3 | 7.5 | 7.2 |
| 3 | ** | ** | | | 210 | 100 | 34.2 | 15.1 | 16.1 |

Sample 2 in the table shows that only a very small amount of glycerin can be obtained from the remaining fraction recovered at a higher temperature. On the other hand, Samples 1 and 3 show that, according to the present invention, glycerin can be obtained from the hexitols, which were recovered from the remaining fraction which was free of decomposition, in a sufficiently large amount (Sample 1) and almost in an amount which is obtained from pure hexitols (Sample 3).

According to the present invention, it is possible to obtain the unreacted residues with advantage and without injuring their qualities by the treatment in the dehexitol tower 4 as well as the other towers at a temperature of not more than 200° C. In addition, the use of this temperature range in combination with the prescribed order of the separation procedure according to the present invention permits the recovery of highly purified glycerin as well as useful 1,2,3-BT and 1,2,4-BT.

According to the present invention, the towers including the dehexitol tower 4 are operated at a temperature of not more than 200° C. and therefore, the purification tower 7, which serves to purify glycerin, is also maintained at a temperature of not more than 200° C.

With regard to the heat source used for the process according to the present invention, it is sufficient to use a steam having a pressure of 30 kg./cm. G in place of the conventional high pressure steam which in turn permits the obtention of various advantages such as savings in regard to the heating medium which is necessary to obtain the higher temperatures, low initial costs, and simplified pipe arrangement.

The following preferred embodiments examples illustrate the preferred embodiments of the invention. However, it is to be understood that these examples are included for illustration purposes and are not to be construed as limiting the invention.

EXAMPLE I

A hydrogenated product of hexitols was passed through a resin column 1 packed with cation and anion exchange resins to remove ionic impurities. The remaining fraction was continuously distilled in a dehydration tower 2 (50 mm. $\phi \times 700$ mm. packed with McMahon packing of ¼" length) under atmospheric pressure at 180° C. at a reflux ratio of 0.5 to remove water content.

The remaining product thus obtained contained the following components: 3.0% remaining water; 0.5% iso-and n butanol; 14.4% PG; 16.4% EG; 3.4% 1,2,3-BT and 1,2,4-BT; 30.9% glycerin; 30.9% unreacted materials; and 0.5% other various polyols.

The dehydrated reaction mixture was then subjected to steam distillation in a glycol-removing tower 3 (50 mm. $\phi \times 1,400$ mm. packed with McMahon packing of ¼" length) under the following conditions: pressure 70 mm. Hg; reflux ratio 1.0 and a temperature inside the tower of 200° C.

There was obtained two fractions, each of which contained respectively mainly glycol (hereinafter designated as glycol fraction), and glycerin and unreacted materials hereinafter designated as crude glycerin fraction).

The crude glycerin fraction, obtained as the remainder from the tower 3 (contained 0.2% PG and EG; 2.3% 1,2,3-BT; 47.8% glycerin; 2.6% 1,2,4-BT; and 47.1% unreacted materials) was steam-distilled in a dehexitol tower 4 (50 mm. $\times 1,000$ mm. packed with McMahon packing of ¼" length) under the following conditions: pressure 35 mm. Hg; reflux ratio 0.5 and a temperature inside the tower of 200° C. obtained by blowing steam into the tower to obtain two fractions mainly containing glycerin and unreacted materials, respectively. The crude glycerin fraction thus obtained from the top of the tower contained PG, EG and 1,2,3-BT, in addition to 3.2% of 1,2,4-BT having a slightly higher boiling point than that of glycerin and 0.5% of unreacted materials, as impurities.

This crude glycerin fraction was fed into a 1,2,4-BT-removing tower 5 (50 mm. $\phi \times 1,400$ mm. packed with McMahon packing of ¼" length, operated under the following conditions: pressure 70 mm. Hg; reflux ratio 0.8 and a temperature inside of the tower of 200° C.), where the continuous steam-distillation was carried out by blowing steam into the tower to recover 1,2,4-BT having a purity of 30.8% with a yield of 58.0%.

This recovered mixture containing glycerin was desirably distilled in tower 5 under similar conditions to obtain 1,2,4-BT having a purity of 70% with a yield of 40%.

The glycerin fraction obtained, which contained no 1,2,4-BT, but 4.8% of 1,2,3-BT and a very small amount of glycols, was steam-distilled in a 1,2,3-BT-removing tower 6 (50 mm. φ×1,800 mm. packed with McMahon packing of ¼" length, and operated under the following conditions: pressure 80 mm. Hg; reflux ratio 15 and a temperature inside the tower of 200° C.) to recover 1,2,3-BT having a purity of 88.1% with a yield of 78.5%.

After this, there was obtained glycerin having a purity of 99.2%, which was observed to be sufficient for general purposes, as a remainder in the tower.

The glycerin thus obtained was preferably further treated in a glycerin purification tower 7 (50 mm. φ×1,400 mm. packed with McMahon packing of ¼" length, and operated under the following conditions: pressure 80 mm.; reflux ratio 1.0 and a temperature inside the tower of 200° C.), where the obtained impure fraction was advantageously returned to the system to the dehexitol tower 4. The system was operated continuously and the yield of the glycerin throughout the steps from the dehydrogenation reaction to the 1,2,3-BT-removing tower 6 was 90.8%.

EXAMPLE II

A similar material to that described in Example I was first treated in a similar manner to that described in Example I to obtain from the 1,2,4-BT-removing tower 6 a crude glycerin fraction (contents, 1,2,4-BT; 1,2,4-BT; very small amounts of EG and PG; as well as an unreacted fraction), which was fed into a 1,2,3-BT-removing tower 6 (50 mm. φ×1,800 mm., packed with McMahon packing of ¼" length, and operated under the following conditions: pressure 70 mm. Hg; reflux ratio 20 and a temperature inside the tower of 200° C.) to recover 1,2,3-BT by the steam distillation. The obtained 1,2,3-BT had a purity of 80.5% with a yield of 89.3%.

After this, there was obtained glycerin which contained no 1,2,3-BT or glycols but did contain 3.7% of 1,2,4-BT and 0.6% of the unreacted fraction as impurities.

The glycerin thus obtained was steam-distilled in 1,2,4-BT removing tower 5 (50 mm. φ×1,600 mm., packed with McMahon packing of ¼" length, operated under the following conditions: pressure 70 mm. Hg; reflux ratio 1.0 and a temperature inside the tower of 200° C.) to recover 1,2,4-BT having a purity of 36.2% with a yield of 60.1%.

Obviously, many modifications and variations of the present invention are possible in the light of the above teachings. It is, therefore, to be understood that within the scope of the appended claims the invention may be practiced otherwise than as specifically shown and described.

We claim:
1. In a process for separating glycerin from a product derived from the hydrogenolysis of hexitols and containing ionic impurities, water, glycols, glycerin, unreacted hexitols, 1,2,3-butanetriol and 1,2,4-butanetriol, including the steps of deionization, dehydration and fractional steam distillations, the improvement comprising: conducting said fractional steam distillations under reduced pressure at a distillation tower temperature not exceeding 200° C., said fractional steam distillations being conducted to provide a glycerin product stream of increasing purity and including (a) a first distillation to remove glycols from the glycerin product stream, (b) a second distillation to remove unreacted hexitols from the glycerin product stream, (c) a subsequent distillation to separate 1,2,4-butanetriols from the glycerin product stream, and (d) a distillation to separate 1,2,3-butanetriols from the glycerin product stream, steps (c) and (d) being conducted in either order and the resulting product being substantially pure glycerin.

2. The process of claim 1 wherein the pressure in step (b) is lower than that of the other distillations.

3. The process of claim 1 wherein all of the distillations are conducted at a temperature of about 200° C.

4. The process of claim 3 wherein the pressure in step (a) is about 70 mm. Hg, the pressure in step (b) is about 35-45 mm. Hg, the pressure in step (c) is about 70 mm. Hg, and the pressure in step (d) is about 80 mm. Hg.

5. The process of claim 4 wherein the glycerin recovered from step (d) is purified by a further steam distillation at about 200° C. and 80 mm. Hg.

6. In a process for separating glycerin from a product derived from the hydrogenolysis of hexitols and containing ionic impurities, water, glycols, glycerin, unreacted hexitols, 1,2,3-butanetriol and 1,2,4-butanetriol, including the steps of deionization, dehydration and fractional steam distillations, the improvement comprising:
(a) removing a glycol fraction by steam distillation under a pressure of about 70 mm. Hg at a distillation tower temperature not exceeding 200° C. and with a reflux ratio of about 1.0;
(b) steam distilling the residual glycerin product under a pressure of about 35-45 mm. Hg at a distillation tower temperature not exceeding 200° C. and with a reflux ratio of about 0.5 to remove a crude glycerin fraction containing 1,2,3-butanetriol and 1,2,4-butanetriol from the unreacted hexitols;
(c) steam distilling the crude glycerin fraction from (b) under a pressure of about 70 mm. Hg at a distillation tower temperature not exceeding 200° C. with a reflux ratio of about 0.8 to remove a glycerin fraction containing 1,2,4-butanetriol; and
(d) steam distilling the glycerin fraction containing 1,2,3-butanetriol under a pressure of about 80 mm. Hg at a distillation tower temperature not exceeding 200° C. with a reflux ratio of about 15 to remove a fraction containing 1,2,3-butanetriol from substantially pure glycerin.

References Cited

UNITED STATES PATENTS

| 1,089,383 | 1/1910 | Wood | 203—79 |
|---|---|---|---|
| 1,416,318 | 5/1922 | Barbet | 203—79 |
| 2,960,447 | 11/1960 | Anderson et al. | 203—79 |
| 2,977,291 | 3/1961 | Hartmann. | |
| 3,278,398 | 10/1966 | Finneran et al. | 203—38 |

FOREIGN PATENTS 785,127  10/1957  Great Britain.

WILBUR L. BASCOMB, JR., Primary Examiner

U.S. Cl. X.R.

203—18. 41. 78. 79. 84. 85. 92. 96: 260—635. 637